United States Patent
Yuzawa

[15] 3,695,005
[45] Oct. 3, 1972

[54] PURIFICATION DEVICE FOR EXHAUST GAS

[72] Inventor: Masaharu Yuzawa, 10-23, 2-chome, Kamiikedai, Ota-ku, Tokyo, Japan

[22] Filed: Nov. 4, 1970

[21] Appl. No.: 86,890

[52] U.S. Cl. ..................55/255, 55/256, 55/259, 55/419, 55/420, 55/DIG. 30, 60/310, 261/121
[51] Int. Cl. ..................................B01d 50/00
[58] Field of Search........55/244, 250, 255, 256, 257, 55/259, 419, 420, DIG. 30; 261/121, 126; 60/29, 30, 310; 23/284, 285

[56] References Cited

UNITED STATES PATENTS

| | | | |
|---|---|---|---|
| 613,093 | 10/1898 | Tyson | 261/121 R |
| 1,536,726 | 5/1925 | Orem | 55/313 |
| 2,250,226 | 7/1941 | Juelson | 55/255 |
| 2,789,032 | 4/1957 | Bagley et al. | 55/257 |
| 3,103,426 | 9/1963 | Lantz, Jr. | 55/258 |
| 3,132,192 | 5/1964 | Lessmann | 55/257 |
| 3,294,380 | 12/1966 | Born | 261/121 R |
| 3,414,248 | 12/1968 | Iwanaga et al. | 55/256 |

Primary Examiner—Bernard Nozick
Attorney—Waters, Roditi, Schwartz & Nissen

[57] ABSTRACT

The purification device for use of exhaust gas to be embodied by the present invention consists of a vertically longer purification tank, and at bottom of the tank there is arranged and equipped with nozzle to which many fine pores are perforated; and an exhaust gas introducing pipe come from exhausting part of engine is connected to said nozzle, and a filter plate is installed at center position of said purification tank, and an entrainment prevention baffle plate is installed at upper position of said filter plate, and an adsorption zone which is filled up with particles of activated carbon is installed at upper position of said entrainment prevention plate. At uppermost position of said purification tank, there is attached the outlet for discharge of exhaust gas, and at bottom position of the tank there is attached a discharge outlet for draining the solution. The purification solution is filled up to an appropriate level which level is lower for the position than the filter plate in said purification tank. A pouring inlet for supply of purification solution is equipped to said purification tank.

1 Claim, 6 Drawing Figures

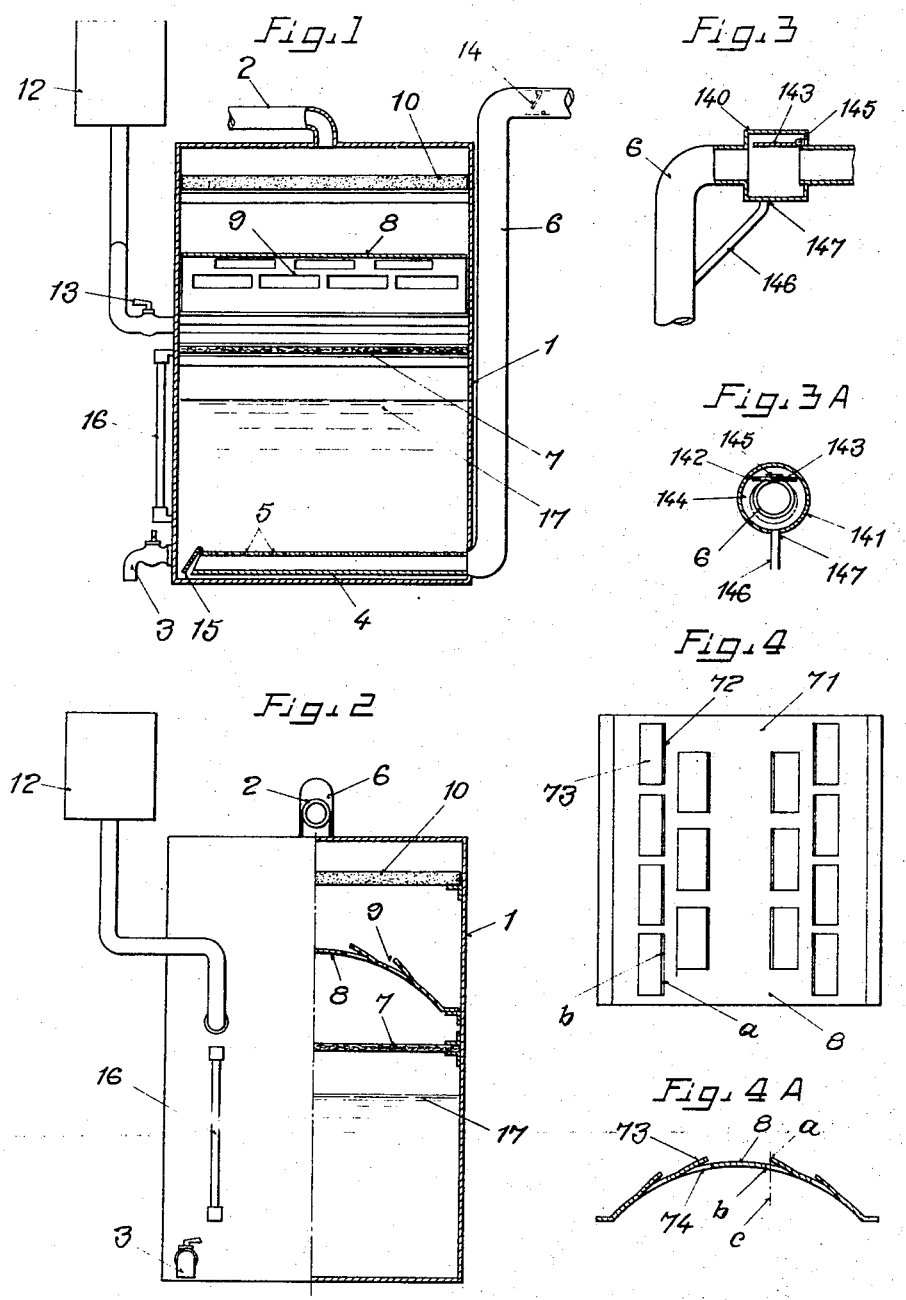

PURIFICATION DEVICE FOR EXHAUST GAS

DETAIL DESCRIPTION OF THE INVENTION

The present invention relates to purification device for exhaust gas, especially, it relates to the purification of exhaust gas from motor car.

Public harm by air pollution which comes from exhaust gas from motor car is drastically increasing currently in accordance with increasing promotion of the motorization, thereby, wide natural circumstances are being destroyed, as well as men and beasts. The necessity for countermeasure of appropriated policy is being strongly voiced and accordingly, it is strongly desirous to develop an excellent purification device for exhaust gas.

The object of this invention is to provide powerful exhaust gas purification device which is simplified in the structure. Another objective of this invention is to provide a purification device for the exhaust gas by dissolving off of the exhaust gas by pressing-in of the gas from many finely perforated nozzle into purification tank in a foamed form, said tank is filled up with alkaline purification solution thereinto the soluble components in the exhaust gas are pressed-in and is diffused away; and therein, the solid particulates existing in the exhaust gas is filtered off by a filter plate and at the same time, the remaining balance which is difficult to remove by such means is removed by fine activated carbon particles.

Further object of the present invention is to provide a device for exhaust gas purification therein a reverse flow check valve is installed for prevention of inverse flow of purifying solution into exhaust gas inlet pipe connecting the exhaust pipe from engine to the exhaust gas discharge nozzle which is arranged and installed in the purification tank.

Further object of the present invention is to provide an exhaust gas purification device enabling to supply purification solution, even if the purification solution decreases, by the installation of supplementary tank so as it can be connected to solution pouring inlet for filling-up of the purification solution into the purification tank.

Further object of the present invention is to provide an exhaust gas purification device wherein a baffle plate is installed at upper position of the filtering plate which filters the solid components in the exhaust gas.

Further objective of the present invention is to provide an exhaust gas purification device therein an automatic control valve is installed, for discharge-control of the exhaust gas, at end position of the exhaust gas discharge nozzle in the purification tank.

The objectives as described foregoing and other objectives and the characteristics of the present invention will be clarified by the undergoing detail descriptions by referring drawings attached to this specification.

FIG. 1 shows sectional view of the exhaust gas purification device to be embodied by the present invention. FIG. 2 shows side elevation of the exhaust gas purification device as shown in the FIG. 1 to be embodied by the present invention. FIG. 3 shows side sectional view of the valve for use of purification solution which is suitable for purification device according to the present invention. FIG. 3-A shows front sectional view of the check valve as shown in FIG. 3. FIG. 4 shows plan view, showing structure of the baffle plate to be used for exhaust purification device of this invention. FIG. 4-A shows side sectional view of the baffle plate, as shown in FIG. 4.

Refer FIG. 1 and 2, which well exhibit the exhaust gas purification device to be embodied by the present invention. The device consists of purification tank 1 which is vertically longer, and a discharge outlet 2 is installed at upper end of the tank 1, and a liquid discharge outlet 3 which equips with cock for draining the purification solution, is installed at the bottom end. At bottom of purification tank 1 there is arranged and equipped with discharge nozzle 4 which having many fine pores 5 perforated thereto. At inlet end of said nozzle 4, one end of the exhaust gas inlet tube 6 is connected to, and other end id connected to the exhaust pipe (not shown in the drawing) come from engine.

At central position of the purification tank 1, there is fixed a filter plate 7 which consists of fibrous material such as gourd fiber or synthetic fiber. A baffle prevention plate 8, to which appropriated pores 9 are perforated as will be described later, is installed and fixed at upper position of said filter plate 7.

Further, an adsorption plate 10 in which fine activated carbon particles are filled up, is mounted at upper position of said entrainment prevention plate 8. An alkaline purification solution 17 such as caustic sodium solution is poured into the purification tank 1 in which various elements as aforesaid are equipped with. Optimal amount of the purification solution is designed so that the car, to which this exhaust gas purification device attaches, can climb up the maximally inclined slope, and on the slope the liquid level of the purification solution 17 does not reach to the filter plate 7. A liquid level gauge 16 is attached at outside of the purification tank 1, which gauge enables to observe the liquid level from outside of the purification device. Further, when the purification solution 17 decreases, or when wanted to exchange dirt purification solution into new solution, an auxiliary tank 12 is installed so as it allows to exchange the solution at anywhere without going to the exchange-station, and which exchange is attained through a cock 13 attached to proper position of the purification tank.

At end of said discharge nozzle 4 of the exhaust gas in the purification tank 1, there is installed an automatic control valve 15 for control of exhaust gas. This is to compensate the fluctuation of changing volume of the exhaust gas to be caused by the change of engine revolution; namely, the valve opens when exhaust gas increases in the case high speed revolution; and when the exhaust gas decreases in the case low speed revolution, it closes, thus the control valve 15 functions to prevent fluctuation by the change of engine loading and also to prevent mis-firing or decrease in the power generation.

Furthermore, a reverse flow check valve 14 can be installed to said exhaust gas inlet pipe 6, which is for prevention of reverse flow of the purification solution when engine stops or when it is in the idling state. Such reverse flow check valve for prevention of reverse flow has been hitherto used in existing devices, however, this has been devised so that a circular valve is directly mounted in the exhaust gas inlet pipe which is circular for the section, and such valve is so configurated as that it is longest in the center part (diameter of the valve)

and is least at the both ends, and resultingly, the interior of the exhaust gas inlet pipe is also configurated similarly; therefore, when wanted to open the valve, the center part of the valve immediately contacts to the upper and inner wall of the exhaust gas inlet pipe and thus the opening of the valve is not enough in the degree; and such was the conventional ones. Accordingly, the present invention is to provide a reverse flow suitable check valve and the device for preventing such defect.

Refer FIG. 3 and 3-A; and expanded part 140 is installed in the piping mid-way of the exhaust gas inlet pipe 6, and which expanded part is increased in the diameter than said inlet pipe 6.

This expansion part 140 forms the open-and-closing part 144 so as the diameter of chord 142 of the circular arc 141 positioned at upper position of exhaust gas inlet pipe 6 is equal or larger than the diameter of check valve 143 which is mounted at top end of the exhaust gas inlet pipe 6 positioned in the connected side of the exhaust pipe form engine. The valve 143 is connected by hinge 145 so as it is free for closing and opening. Further, one end of a return pipe 146, which is for sending back of the reverse flow of the solution, is connected to said expansion part 140 at the lower end; and another end is connected to the lower part of the exhaust gas inlet pipe, or the end is opened directly into the purification tank.

By the virtue of check valve device for prevention of reverse flow, the valve can be fully opened, and thus the reaction to be caused by the exhaust gas pressure does not load onto engine; furthermore, even if there occurs reverse flow of the purification solution, this shall be kept in said expansion part and is returned back into purification tank through the return pipe. In collaboration with the action of aforesaid automatic control valve for volume control of the exhaust gas with the discharge nozzle, this check valve device for prevention of reverse flow prevents the change of load and the reaction to engine to be caused by the fluctuation of exhaust gas volume which comes from change of the engine revolution.

Nextly, refer FIG. 4 and 4-A, a baffle plate 9 is shown in these drawings which are suitable for use in this exhaust gas purification device. This baffle plate 9 consists of flat plate 71, to which many rectangular tongue pieces 72 are cut on the plate and thus slitted tongues are well enough for the use; and which material consists of chemically resisting material against the purification solution 17 such as appropriately surface-treated metal material or synthetic resin material. Otherwise from this design, it is well enough for the configuration in which, gas openings 74 are formed so as it opens toward side direction, the tongue pieces being directed toward otherwise from vertical direction, and in which the terminal end $a$ of the tongue pieces 73 and the terminal edge $b$ of the rectangular tongue pieces 73 are closed up nearby the vertical line 4 by making curvature in a circular arc with the flat plate 71 to which rectangular tongue pieces (72) are cut thereon as aforesaid. By the use of baffle plate 71 thus fabricated, the entrainment of fine particles of the purification solution is prevented by the entrainment prevention baffle plate and does not jump up above the plate, when many gas baffle to be foamed in the purification solution 17 are disappeared on the surface of the solution and even if the finely particulated solution splashes by the vibration of the purification device by the vibrational moment of car. Accordingly, the loss of purification solution is less, and thus the solution does not spray into atmosphere from the discharge outlet 2, therefore, the safety can be assured even if a strongly alkaline solution is used.

Now, when such purification device for exhaust gas to be embodied by the present invention which composed of parts as described in the foregoing, is used in cases such as it is mounted on motor cars, the exhaust gas from engine is introduced into discharge nozzle 4 in the purification tank 1 through exhaust gas inlet pipe 6. Then the exhaust gas is discharged into purification solution 17 through fine pores 5 of said nozzle 4 and is diffused into purification solution, therein the soluble components such as sulfurdioxide gas in the exhaust gas is dissolved and is removed by the alkaline purification solution. The balance of exhaust gas is discharged as of gas bubble foam to the upper volume of the purification solution, which gas bubbles are further cleaned during they pass through the filter plate installed at center position of the purification tank 1, and thus the solid components which were not removed by the purification solution 17, such as carbon, are removed off. By such devising the majority of injurious components in the exhaust gas are removed off by the filter plate and by the purification solution; and furthermore, the remaining gaseous components such as carbon monoxide or sulfurdioxide are lastly remove off by the adsorption by particulated activated carbon during passing through the activated carbon layer inserted at uppermost position of the tank. Thus the harmful components in exhaust gas are completely removed, accordingly the exhaust gas to be discharged from discharge outlet becomes harmless and this is quite safe for the atmospheric pollution.

Every one might easily understand from above description of the present invention that every of the automatic control valve of the discharge nozzle and check valve for prevention of reverse flow or entrainment prevention buffle or auxiliary tank plays effective function as attaining aforesaid objectives during operation of this purification device as explained foregoing. Also, it is reasonably understood that the best arrangement to be made for attaining each function corresponded to each of the equipment composing the exhaust gas purification device of the present invention comes in the order of; purification solution, filter plate, followed by activated carbon zone. For instance, the reason why the activated carbon zone comes at uppermost position, is to be understood as that the adsorption capability of the activated carbon does not lower by overheating during passing through of the exhaust gas from engine since it is preliminarily cooled down by passing through the purification solution, and thus the activated carbon receives no harm for the deterioration by hot exhaust gas.

In the drawings, the exhaust gas purification device according to the present invention has been explained by quoting specific examples, however, it is to be easily understood by the professioners that various modifications and alterations are attainable within limitation of the principles to be embodied by the present invention.

What is claimed is:

1. An exhaust gas purification device for use in automobiles comprising a purification tank having a gas outlet at its top and a liquid outlet at its bottom, said tank being partly filled with an alkaline solution, an exhaust gas discharge nozzle having a plurality of small holes or pores horizontally mounted at the bottom of said tank, a filter plate of suitable fiber materials mounted at the central portion of said tank leaving a clearance from the level of said solution, an adsorption layer formed of a body of particles of activated carbon mounted in the uppermost portion of said tank, a baffle plate mounted within the clearance between said filter plate and said adsorption layer, said baffle plate having on its surface a plurality of rectangular tongue pieces integrally formed with said surface and extending toward same sideward direction and a plurality of rectangular gas openings partly covered by said tongue pieces all positioned in several rows, a pipe connection for exhaust gases from the engine to the inlet of said nozzle, valve means comprising an automatic control valve fixed at the free end of said nozzle and operative depending on the amount of the exhaust gases introduced, and a reverse flow check valve fixed midway within said pipe connection for prevention of reverse flow of said purification solution.

* * * * *